Patented Aug. 4, 1936

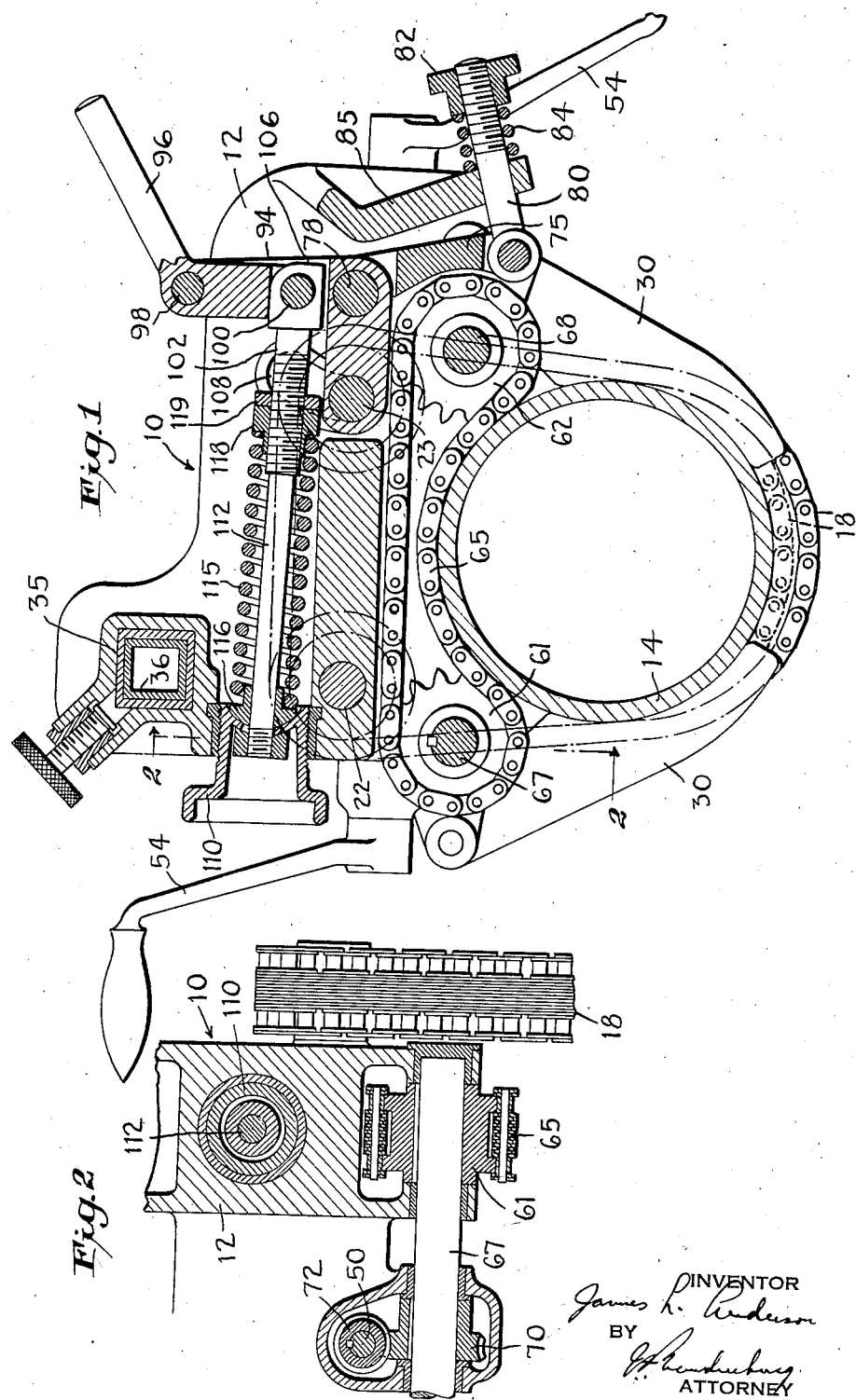

2,050,146

UNITED STATES PATENT OFFICE 2,050,146

CIRCUMFERENTIAL PIPE CUTTING OR WELDING MACHINE

James L. Anderson, Closter, N. J., assignor to Air Reduction Company, Incorporated, New York, N. Y., a corporation of New York Application October 10, 1933, Serial No. 692,972

4 Claims. (Cl. 266—23)

This invention relates to pipe cutting or welding machines which have a torch carriage with rolling supports on the surface of the pipe and a flexible member passing around the pipe to hold the carriage against the pipe.

Chains passing around the pipe and over sprockets on the carriage have been used, and relative movement of the torch carriage and pipe has been produced by driving a sprocket over which the chain passes. The chain is kept under sufficient tension to prevent it from slipping on the pipe and producing an irregular torch speed. When using such a machine on sloping or vertical pipes, any slipping of the chain permits the carriage to creep sideways so that the torch has a spiral movement instead of following a true circumferential path.

It is, of course, undesirable to have the tension of the chain greater than necessary to prevent slipping, because this chain tension in effect increases the load of the torch carriage on its rolling supports and thus increases both the rolling friction and bearing friction which must be overcome to obtain relative movement of the pipe and carriage.

This invention has for its object to provide an improved circumferential pipe cutting or welding machine of the type having a torch carriage with rolling supports for running on a pipe surface and a flexible member for passing around the pipe to hold the carriage against the pipe, and comprises novel features and combinations of elements that permit the use of light chain tension and make the machine convenient to operate.

The invention provides mechanism for driving the rolling supports of the carriage to produce the relative movement of the pipe and carriage. The driving strain is thus removed from the flexible member which holds the carriage on the pipe and less tension is necessary to prevent slipping of the flexible member.

Other features, advantages and objects of the invention will appear or be pointed out as the description proceeds.

In the accompanying drawing, forming a part hereof:

Fig. 1 is a sectional view showing a pipe cutter embodying the invention, the machine being shown in position on a pipe; and Fig. 2 is a sectional view on the line 2—2 of Fig. 1, with the pipe omitted.

A torch carriage 10 includes a frame 12 having sprocket wheels 61 and 62 with a flexible member or chain 65 running around the sprocket wheels and comprising an endless track on which the carriage is supported on the surface of a pipe 14.

A flexible member or chain 18 passes around the pipe 14 and over sprocket wheels on axles 22 and 23, which are supported by the carriage. These wheels are rotatable on their axles 22 and 23, and the axle 23 is movable away from the pipe to tension the chain 18 so that the carriage is held firmly against the pipe 14. There are sprockets at both ends of the axles 22 and 23 and a chain 18 at each end of the carriage.

Chain guides 30 are pivotally connected with the carriage frame 12 and serve to maintain the chains in a plane at right angles to the pipe axis so that a cutting torch supported by the carriage cuts a right section through the pipe.

A cutting or welding torch can be supported directly from a sleeve 35 of the carriage, or from a bar 36 which has one end clamped in the sleeve 35.

The sprocket wheel 61 is keyed to an axle 67, and the sprocket wheel 62 has an axle 68. These axles 67 and 68 run the full length of the carriage and have similar sprocket wheels on their other ends, with a chain similar to the chain 65.

A worm wheel 70 (Fig. 2) is keyed to the axle 67 and is driven by a worm gear 72. The worm gear 72 is connected to a shaft 50, which is manually operated by a crank handle 54. When this handle is rotated to drive the axle 67 and sprocket wheels 61, the chain 65 moves around the sprocket wheels and causes relative movement of the carriage and pipe. The lower run of the chain 65 in contact with the surface of the pipe provides a substantial area for friction so that there is no slipping of the chain on the pipe when the driving mechanism is being operated.

The axle 68 is carried by a pivoted frame 75 which oscillates about a shaft 78 supported by the carriage frame 12. A rod 80 is pivotally connected to the frame 75. A nut 82 is threaded on the end of the rod 80, and a spring 84, compressed between the nut 82 and a lug 85 of the carriage frame 12, urges the pivoted frame 75 and axle 68 to the right in Fig. 1 to keep the chain 65 always under tension.

The mechanism for tensioning the chain 18 which extends around the pipe is the same as in my Patent No. 1,981,340. With the parts in the positions shown in Fig. 1, the chain 18 is released and will hang in the position shown in full lines. When the axle 23 is moved away from the pipe 14, the chain 18 is drawn firmly against the pipe as indicated in broken lines.

The axle 23 is supported by a bell-crank 94, which is pivotally connected to the carriage frame by the shaft 78. A chain release handle 96 is pivotally connected with the bell-crank by a pin 98. The lower end of the handle 96, beyond the pin 98, is pivotally connected by a pin 100 with the end of a threaded sleeve member 102. The end of the sleeve member has a face 106 which abuts against the handle 96 to limit the movement of the handle when it is rotated clockwise into position to tension the chain 18. The axle 23 extends through a slot 108 in the frame 12, and the ends of this slot limit the total movement of the axle and tensioning means.

A tension-adjusting screw 110 is threaded into the frame 12, and a rod 112 has a ball and socket connection with the adjusting screw. The other end of this rod extends into the sleeve member 102, in which it slides freely for telescopic movement.

A spring 115 surrounds the rod 112. One end of the spring contacts with an abutment 116, which has a ball and socket bearing with the tension-adjusting screw 110. The other end of the spring 115 contacts with an abutment 118 which is threaded on the sleeve member 102 and held against rotation by a lock nut 119.

The tension of the chain 18 can be increased by turning the adjusting screw 110 to increase the compression on the spring 115. Since the force for driving the torch carriage is not transmitted through the chain 18, it is not necessary to maintain as much tension on this chain as in machines where it constitutes the driving means. Lighter tension on the chain 18 decreases the load on the wheels of the torch carriage, and thus decreases the rolling and bearing friction which must be overcome in moving the carriage on the pipe.

It will be apparent that the invention is not limited to the particular embodiment which has been illustrated and described, and that features of the invention may be used without others.

I claim:

1. A circumferential pipe cutting or welding machine comprising a torch carriage; means supporting the carriage for movement on the surface of the pipe including wheels and an endless flexible member passing around the wheels; means for holding the carriage on a pipe with one run of said flexible member in contact with the pipe; and driving mechanism for rotating one of the wheels to drive said flexible member and cause relative circumferential movement of the carriage and the pipe.

2. A circumferential pipe cutting or welding machine comprising a torch carriage; an endless track running around wheels on the carriage for supporting the carriage on the surface of a pipe; mechanism for driving the endless track to cause relative circumferential movement between the carriage and a pipe; and means for holding the carriage against a pipe.

3. A circumferential pipe cutting or welding machine comprising a torch carriage; an endless track running around wheels on the carriage for supporting the carriage on the surface of a pipe; mechanism for driving the endless track to cause relative circumferential movement between the carriage and a pipe; a flexible member for passing around the pipe and over the carriage to hold the carriage against the pipe; and resilient means for tensioning said flexible member to control the force with which the carriage is held against the pipe.

4. A circumferential pipe cutting or welding machine comprising a torch carriage; a sprocket chain running over sprockets on the carriage located so that one run of the chain serves as an endless track for supporting the carriage on the surface of a pipe; mechanism for driving one of the sprockets to cause relative circumferential movement between the carriage and pipe; wheels supported by the carriage; a flexible member for passing over said wheels and around the pipe to hold the carriage against the pipe; and spring means for urging one of said wheels away from the pipe to maintain the flexible member under tension.

JAMES L. ANDERSON.